United States Patent
Nair et al.

(10) Patent No.: US 11,564,086 B2
(45) Date of Patent: Jan. 24, 2023

(54) SECURE MOBILE-TERMINATED MESSAGE TRANSFER

(71) Applicant: Nokia Technologies Oy, Espoo (FI)

(72) Inventors: Suresh Nair, Whippany, NJ (US); Ranganathan Mavureddi Dhanasekaran, Munich (DE)

(73) Assignee: Nokia Technologies Oy, Espoo (FI)

( * ) Notice: Subject to any disclaimer, the term of this patent is extended or adjusted under 35 U.S.C. 154(b) by 3 days.

(21) Appl. No.: 17/176,762

(22) Filed: Feb. 16, 2021

(65) Prior Publication Data

US 2022/0264290 A1 Aug. 18, 2022

(51) Int. Cl.
*H04W 12/02* (2009.01)
*H04W 12/033* (2021.01)
*H04W 12/45* (2021.01)
*H04W 68/00* (2009.01)
*H04W 12/50* (2021.01)

(52) U.S. Cl.
CPC ......... *H04W 12/033* (2021.01); *H04W 12/02* (2013.01); *H04W 12/45* (2021.01); *H04W 12/50* (2021.01); *H04W 68/005* (2013.01)

(58) Field of Classification Search
CPC .............................. H04W 12/03; H04W 12/50
See application file for complete search history.

(56) References Cited

U.S. PATENT DOCUMENTS

| | | | |
|---|---|---|---|
| 2012/0166563 A1* | 6/2012 | Booking | H04L 51/38 709/206 |
| 2014/0023193 A1* | 1/2014 | Landheer | H04L 63/0428 380/268 |
| 2021/0127351 A1* | 4/2021 | Stojanovski | H04W 48/16 |

OTHER PUBLICATIONS

3GPP, "3rd Generation Partnership Project; Technical Specification Group Services and System Aspects; System Architecture for the 5G System (5GS); Stage 2 (Release 16)," 3GPP TS 23.501 V16.5.0, Jul. 2020, 441 pages.

3GPP, "3rd Generation Partnership Project; Technical Specification Group Services and System Aspects; Security Architecture and Procedures for 5G System (Release 16)," 3GPP TS 33.501 V16.3.0, Jul. 2020, 248 pages.

3GPP "3rd Generation Partnership Project; Technical Specification Group Services and System Aspects; Procedures for the 5G System (5GS); Stage 2 (Release 16)," 3GPP TS 23.502 V16.3.0, Dec. 2019, 558 pages.

(Continued)

*Primary Examiner* — Michael T Vu
(74) *Attorney, Agent, or Firm* — Ryan, Mason & Lewis, LLP (57) ABSTRACT

Techniques for securing mobile-terminated messages are disclosed. In one example, a method comprises receiving, at user equipment, a concealed message from a communication network with which the user equipment is in an idle state. The method de-conceals the concealed message, at the user equipment, to obtain at least one indicator value using at least a security value previously agreed upon with the communication network. The method generates a decision, at the user equipment, with respect to the idle state based on the obtained at least one indicator value. In one example, the at least one indicator value comprises a paging cause value.

26 Claims, 9 Drawing Sheets

(56) References Cited

OTHER PUBLICATIONS

3GPP "3rd Generation Partnership Project; Technical Specification Group Services and System Aspects; Study on system enablers for devices having multiple Universal Subscriber Identity Modules (USIM) (Release 17)," 3GPP TR 23.761 V1.2.0, Nov. 2020, 108 pages.

3GPP "3rd Generation Partnership Project; Technical Specification Group Services and System Aspects; Study on the security of the system enablers for devices having Multiple Universal Subscriber Identity Modules; (Release 17)," 3GPP TR 33.873 V0.2.0, Jan. 2021, 10 pages.

\* cited by examiner

| 5QI VALUE | RESOURCE e TYPE | DEFAULT PRIORITY LEVEL | PACKET DELAY BUDGET (NOTE 3) | PACKET ERROR RATE | DEFAULT MAXIMUM DATA BURST VOLUME (NOTE 2) | DEFAULT AVERAGING WINDOW | EXAMPLE SERVICES |
|---|---|---|---|---|---|---|---|
| 1 | GBR | 20 | 100 ms (NOTE 11, NOTE 13) | $10^{-2}$ | N/A | 2000 ms | CONVERSATIONAL VOICE |
| 2 | (NOTE 1) | 40 | 150 ms (NOTE 11, NOTE 13) | $10^{-3}$ | N/A | 2000 ms | CONVERSATIONAL VIDEO (LIVE STREAMING) |
| 3 (NOTE 14) | | 30 | 50 ms (NOTE 11, NOTE 13) | $10^{-3}$ | N/A | 2000 ms | REAL TIME GAMING, V2X MESSAGES ELECTRICITY DISTRIBUTION – MEDIUM VOLTAGE, PROCESS AUTOMATION – MONITORING |
| 4 | | 50 | 300 ms (NOTE 11, NOTE 13) | $10^{-6}$ | N/A | 2000 ms | NON-CONVERSATIONAL VIDEO (BUFFERED STREAMING) |
| 65 (NOTE 9, NOTE 12) | | 7 | 75 ms (NOTE 7, NOTE 8) | $10^{-2}$ | N/A | 2000 ms | MISSION CRITICAL USER PLANE PUSH TO TALK VOICE (e.g., MCPTT) |
| 66 (NOTE 12) | | 20 | 100 ms (NOTE 10, NOTE 13) | $10^{-2}$ | N/A | 2000 ms | NON-MISSION-CRITICAL USER PLANE PUSH TO TALK VOICE |
| 67 (NOTE 12) | | 15 | 100 ms (NOTE 10, NOTE 13) | $10^{-3}$ | | | MISSION CRITICAL VIDEO USER PLANE |
| 75 (NOTE 14) | | | | | | | |

Ⓐ

| | | | | | | |
|---|---|---|---|---|---|---|
| 71 | 56 | 150 ms (NOTE 11, NOTE 13, NOTE 15) | $10^{-6}$ | N/A | 2000 ms | "LIVE" UPLINK STREAMING (e.g., TS 26.238 [76]) |
| 72 | 56 | 300 ms (NOTE 11, NOTE 13, NOTE 15) | $10^{-4}$ | N/A | 2000 ms | "LIVE" UPLINK STREAMING (e.g., TS 26.238 [76]) |
| 73 | 56 | 300 ms (NOTE 11, NOTE 13, NOTE 15) | $10^{-8}$ | N/A | 2000 ms | "LIVE" UPLINK STREAMING (e.g., TS 26.238 [76]) |
| 74 | 56 | 500 ms (NOTE 11, NOTE 13, NOTE 15) | $10^{-8}$ | N/A | 2000 ms | "LIVE" UPLINK STREAMING (e.g., TS 26.238 [76]) |
| 76 | 56 | 500 ms (NOTE 11, NOTE 13, NOTE 15) | $10^{-4}$ | N/A | 2000 ms | "LIVE" UPLINK STREAMING (e.g., TS 26.238 [76]) |
| 5 | NON-GBR | 100 ms (NOTE 10, NOTE 13) | $10^{-6}$ | N/A | N/A | IMS SIGNALING |
| 6 | (NOTE 1) | 300 ms (NOTE 10, NOTE 13) | $10^{-6}$ | N/A | N/A | VIDEO (BUFFERED STREAMING) TCP-BASED (e.g., www, e-mail, chat, ftp, p2p file sharing, progressive video, etc.) |
| 7 | | 100 ms (NOTE 10, NOTE 13) | $10^{-3}$ | N/A | N/A | VOICE, VIDEO (LIVE STREAMING) INTERACTIVE GAMING |
| 8 | | 300 ms (NOTE 13) | $10^{-6}$ | N/A | N/A | VIDEO (BUFFERED STREAMING) TCP-BASED (e.g., www, e-mail, chat, ftp, p2p file sharing, progressive video, etc.) |
| 9 | | 90 | | | | |

FIG. 3B cont. (1)

| | | | | | | |
|---|---|---|---|---|---|---|
| 69 (NOTE 9, NOTE 12) | | 60 ms (NOTE 7, NOTE 8) | $10^{-6}$ | N/A | N/A | MISSION CRITICAL DELAY SENSITIVE SIGNALING (e.g., MC-PTT SIGNALING) |
| 5 | | 200 ms (NOTE 7, NOTE 10) | $10^{-6}$ | N/A | N/A | MISSION CRITICAL DATA (e.g., EXAMPLE SERVICES ARE THE SAME AS 5QI 6/8/9) |
| 55 | | 50 ms (NOTE 10, NOTE 13) | $10^{-2}$ | N/A | N/A | V2X MESSAGES |
| 65 | | 10 ms (NOTE 5, NOTE 10) | $10^{-6}$ | N/A | N/A | LOW LATENCY eMBB APPLICATIONS AUGMENTED REALITY |
| 68 | DELAY CRITICAL GBR | 10 ms (NOTE 4) | $10^{-4}$ | 255 BYTES | 2000 ms | DISCRETE AUTOMATION (SEE TS 22.261 [2]) |
| 79 | | 10 ms (NOTE 4) | $10^{-4}$ | 1354 BYTES (NOTE 3) | 2000 ms | DISCRETE AUTOMATION (SEE TS 22.261 [2]); V2X MESSAGES (UE - RSU PLATOONING, ADVANCED DRIVING: COOPERATIVE LANE CHANGE WITH LOW LoA, SEE TS 22.186 [111]) |
| 80 | | 30 ms (NOTE 6) | $10^{-5}$ | 1354 BYTES (NOTE 3) | 2000 ms | INTELLIGENT TRANSPORT SYSTEMS (SEE TS 22.261 [2]) |
| 82 | | 5 ms (NOTE 5) | $10^{-5}$ | 255 BYTES | 2000 ms | ELECTRICITY DISTRIBUTION - HIGH VOLTAGE (SEE TS 22.261 [2]); V2X MESSAGES (REMOTE DRIVING. SEE TS 22.186 [111], NOTE 16) |
| 83 | | 5 ms (NOTE 5) | $10^{-4}$ | 1354 BYTES | 2000 ms | V2X MESSAGES (ADVANCED DRIVING: COLLISION AVOIDANCE, PLATOONING WITH HIGH LoA. SEE TS 22.186 [111]) |

SECURE MOBILE-TERMINATED MESSAGE TRANSFER

FIELD

The field relates generally to communication systems, and more particularly, but not exclusively, to security management within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," and TS 23.502, entitled "Technical Specification Group Services and System Aspects; Procedures for the 5G System (5GS)," the disclosures of which are incorporated by reference herein in their entireties. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues associated with mobile-terminated messages (e.g., messages sent from the 5GC and terminating in the UE) can present a significant challenge.

SUMMARY

Illustrative embodiments provide techniques for securing mobile-terminated messages. One non-limiting example of a mobile-terminated message with which one or more illustrative embodiments may be implemented is a message comprising a paging cause value.

In one illustrative embodiment, a method comprises receiving, at user equipment, a concealed message from a communication network with which the user equipment is in an idle state. The method de-conceals the concealed message, at the user equipment, to obtain at least one indicator value using at least a security value previously agreed upon with the communication network. The method generates a decision, at the user equipment, with respect to the idle state based on the obtained at least one indicator value.

In another illustrative embodiment, a method comprises generating, at a network entity of a communication network, a message with at least one indicator value usable by user equipment to make a decision on an idle state with which the user equipment is in with respect to the communication network. The method conceals the message, at the network entity, using at least a security value previously agreed upon with the user equipment. The method sends the concealed message from the network entity to the user equipment.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501, 23.502 and 33.501. Other 3GPP TS/TR documents may provide other details that one of ordinary skill in the art will realize. However, while well-suited for 5G-related 3GPP standards, as well as 4G-related 3GPP standards, embodiments are not necessarily intended to be limited to any particular standards.

Illustrative embodiments are related to security associated with mobile-terminated messages (e.g., messages that terminate at user equipment). Prior to describing such illustrative embodiments, a general description of main components of a 5G network will be described below in the context of FIGS. 1 and 2. However, it is to be appreciated while illustrative embodiments are well-suited for 5G networks, alternative embodiments for providing secure mobile-terminated messages can be implemented in other communications system architectures, by way of example only, LTE networks, hybrid networks, etc.

Figure 1:
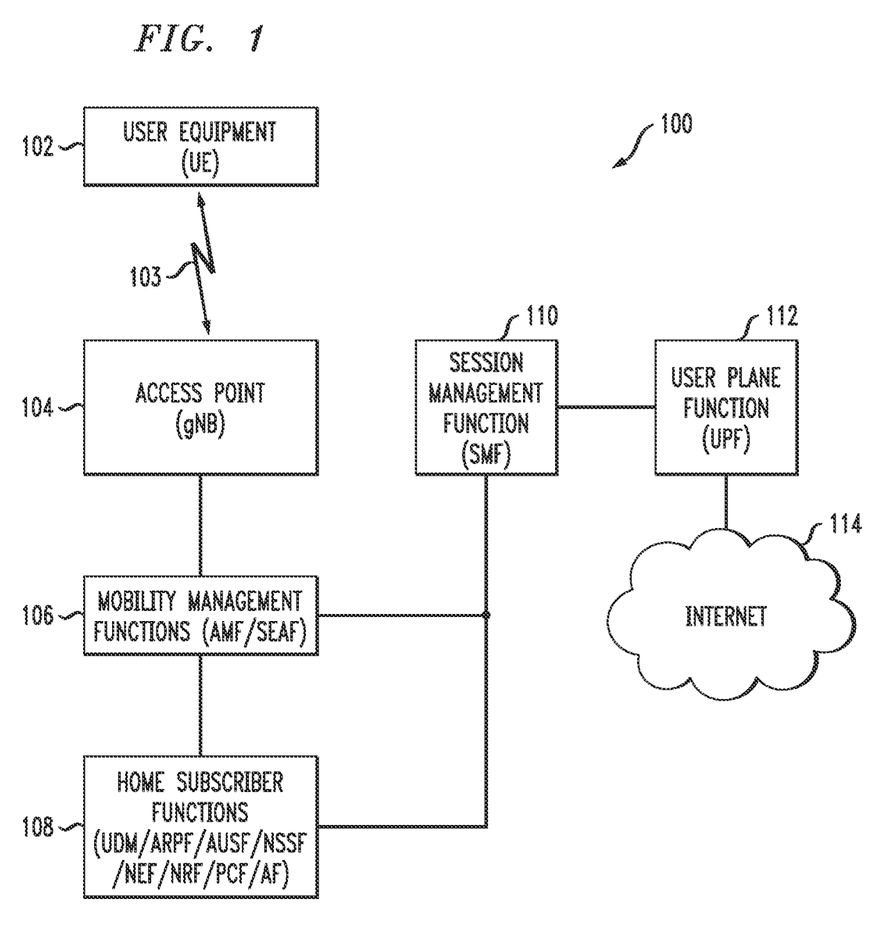
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, at least some functions that facilitate an explanation of illustrative embodiments are represented. Subsequent figures may depict some additional elements/functions (i.e., network entities).

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME as illustrated in FIG. 1) part. The UICC is the user-dependent part of the UE and contains at least one Universal Subscriber Identity Module (USIM as illustrated in FIG. 1) and appropriate application software. Some embodiments will be described herein with a multiple USIM (MUSIM) UE, while other embodiments will be described herein with a single USIM UE. The USIM securely stores a permanent subscription identifier and its related key, which are used to uniquely identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) unique to the UE. In one embodiment, the IMSI is a fixed 15-digit length and consists of a 3-digit Mobile Country Code (MCC), a 2-digit or 3-digit Mobile Network Code (MNC), and a 9-digit or 10-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI). Another example of a SUPI uses a Network Access Identifier (NAI). NAI is typically used for IoT communication.

The access point 104 is illustratively part of an access network, also referred to as a radio access network (RAN), of the communication system 100. Such an access network may comprise, for example, a plurality of base stations and one or more associated radio network control functions. The base stations and radio network control functions may be logically separate entities, but in a given embodiment may be implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity or authentication entities. Further, an Authentication Credential Repository and Processing Function (ARPF) can be utilized in conjunction with the UDM. In addition, home subscriber functions may also include, but are not limited to, Network Slice Selection Function (NSSF), Network Exposure Function (NEF), Network Repository Function (NRF), Policy Control Function (PCF), and Application Function (AF).

Note that a UE, such as UE 102, is typically subscribed to what is referred to as a Home Public Land Mobile Network (HPLMN) in which some or all of the home subscriber functions 108 reside. The HPLMN is also referred to as the Home Environment (HE). If the UE is roaming (not in the HPLMN), it is typically connected with a Visited Public Land Mobile Network (VPLMN) also referred to as a visited or serving network. Some or all of the mobility management functions 106 may reside in the VPLMN, in which case, functions in the VPLMN communicate with functions in the HPLMN as needed. However, in a non-roaming scenario, mobility management functions 106 and home subscriber functions 108 can reside in the same communication network. Furthermore, one or more of subscriber functions 108 can be part of a VPLMN if appropriate in certain circumstances. Embodiments described herein are not limited by which functions reside in which PLMN (i.e., HPLMN or VPLMN).

The access point 104 is also operatively coupled (via one or more of functions 106 and/or 108) to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
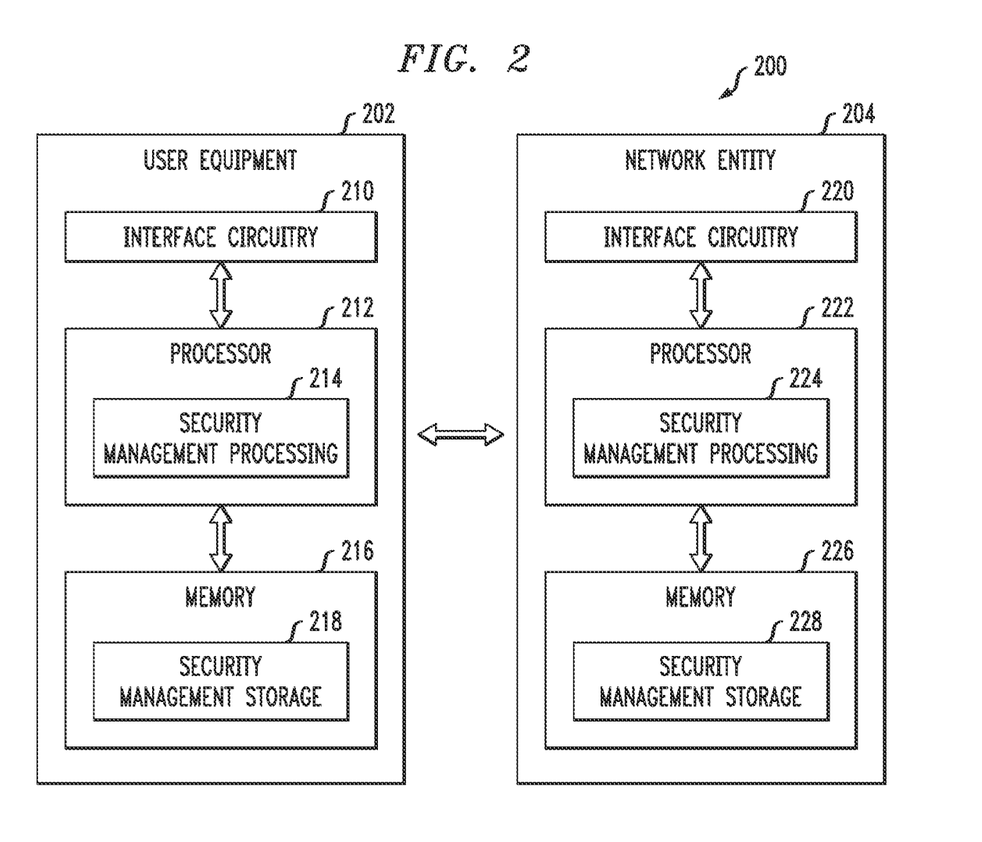
FIG. 2 illustrates user equipment and at least one network entity with which one or more illustrative embodiments may be implemented.

FIG. 2 is a block diagram of user equipment and a network entity for providing message security management in a communication system in an illustrative embodiment. System 200 is shown comprising user equipment 202 and a network entity 204.

It is to be appreciated that user equipment 202 represents one example of UE 102 described above in the context of FIG. 1. It is to be further appreciated that the network entity 204 represents one or more network entities (e.g., network functions, nodes, components, elements, services, etc.) that are configured to provide security management and other techniques described herein, for example, but not limited to, AMF, SEAF, UDM, ARPF, AUSF, NSSF, NEF, NRF, PCF and AF such as are part of an SBA-based 5G core network (which is part of an HPLMN, VPLMN, or both).

Network entity 204 can also be a network function, node, component, element, service, etc., external to the SBA-based 5G core network, i.e., a third-party external enterprise network. Further, network entity 204 can represent one or more processing devices configured to orchestrate and manage instantiation of one or more network functions (or other security management entities) within an SBA-based 5G core network or any communication network. Instantiation of a network function is described in the various 3GPP standards and otherwise well known to those of ordinary skill in the art.

User equipment 202 comprises a processor 212 coupled to a memory 216 and interface circuitry 210. The processor 212 of user equipment 202 includes a security management processing module 214 that may be implemented at least in part in the form of software executed by the processor. The processing module 214 performs operations associated with security management as described in conjunction with subsequent figures and otherwise herein. The memory 216 of user equipment 202 includes a security management storage module 218 that stores data generated or otherwise used during security management operations.

The network entity 204 comprises a processor 222 coupled to a memory 226 and interface circuitry 220. The processor 222 of the network entity 204 includes a security management processing module 224 that may be implemented at least in part in the form of software executed by the processor 222. The processing module 224 performs operations associated with security management as described in conjunction with subsequent figures and otherwise herein. The memory 226 of the network entity 204 includes a security management storage module 228 that stores data generated or otherwise used during security management operations.

The processors 212 and 222 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments. In addition, illustrative embodiments may be realized in a completely virtualized environment using software, running on a cloud platform, to emulate the various network functions.

The memories 216 and 226 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 illustratively comprise transceivers or other communication hardware or firmware that allows the associated system elements to communicate with one another in the manner described herein.

It is apparent from FIG. 2 that user equipment 202 is configured for communication with network entity 204 and vice-versa via their respective interface circuitries 210 and 220. This communication involves user equipment 202 sending data to the network entity 204, and the network entity 204 sending data to the user equipment 202. However, in alternative embodiments, other network elements may be operatively coupled between user equipment 202 and network entity 204. The term "data" as used herein is intended to be construed broadly, so as to encompass any type of information that may be sent between user equipment and a network entity, as well as between network entities, including, but not limited to, messages, identifiers, keys, indicators, user data, control data, etc.

It is to be appreciated that the particular arrangement of components shown in FIG. 2 is an example only, and numerous alternative configurations may be used in other embodiments. For example, any given network entity can be configured to incorporate additional or alternative components and to support other communication protocols.

Other system elements such as gNB 104 may each also be configured to include components such as a processor, memory and network interface. These elements need not be implemented on separate stand-alone processing platforms, but could instead, for example, represent different functional portions of a single common processing platform.

Still further, while FIG. 2 illustrates example architectures and interconnectivity between user equipment and a network entity, FIG. 2 can also represent example architectures and interconnectivity between multiple network entities (e.g., 202 can represent one network entity operatively coupled to another network entity in the form of network entity 204). More generally, FIG. 2 can be considered to represent two processing devices configured to provide respective security management functionalities and operatively coupled to one another in a communication system.

Figure 3A:
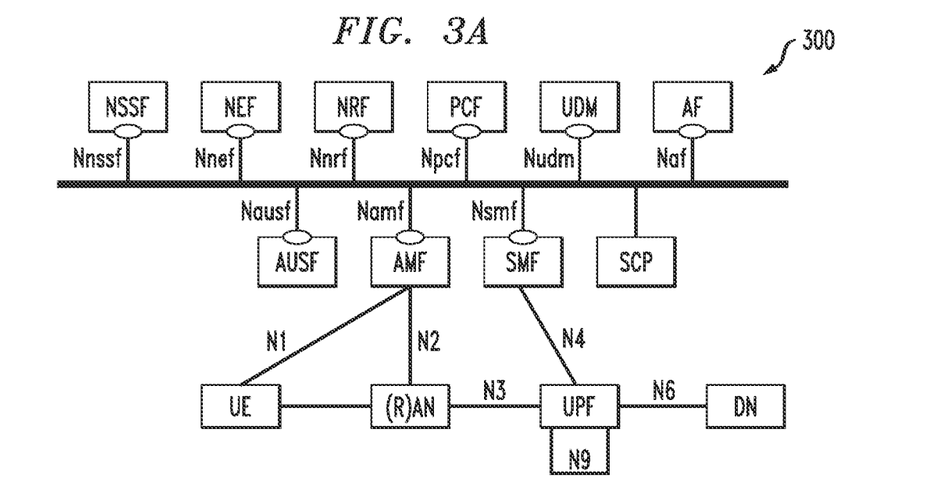
FIG. 3A illustrates a service-based architecture for a communication system within which one or more illustrative embodiments may be implemented.

The architecture for 5G systems is currently being standardized in 3GPP. As mentioned above, the 3GPP TS 23.501 defines the 5G system architecture as service-based, e.g., Service-Based Architecture (SBA). FIG. 3A illustrates a general 5G SBA implementation 300 as further described in 3GPP TS 23.501. Note that the network entities (elements/functions) in FIG. 3A are the same or similar to those described above in the context of FIGS. 1 and 2. The notation of a capital "N" in front of the network entity name (e.g., Namf) denotes the SBA-based interface within the core network used to access the particular network entity (e.g., AMF).

It is to be appreciated that a primary authentication procedure between a UE and the 5G core network is based on an Authentication and Key Agreement (AKA) challenge being sent from a home environment (HE or HPLMN) to the UE (e.g., as defined in the above-referenced TS 33.501). Note that the terms "home environment," "home network," and "home PLMN" may be used interchangeably herein.

Illustrative embodiments address, inter alia, issues involving message security, particularly security of mobile-terminated messages such as paging messages transferred from the core network to the UE. In some cases, UEs have multiple USIMs, as will be explained further below. 3GPP TR 23.761 and TR 33.873, entitled "Technical Specification Group Services and System Aspects; Study on System Enablers for Devices Having Multiple Universal Subscriber Identity Modules (MUSIM)" the disclosures of which are incorporated by reference herein in their entireties, mention issues that relate to MUSIM UEs.

For example, in TR 23.761, a MUSIM UE (or, more generally, MUSIM device) with concurrent registrations over 3GPP radio access technology (RAT) associated with MUSIM procedures is discussed. A MUSIM device can efficiently perform some activity (e.g., listen to paging) in one network or system while communicating in another network or system.

Figure 3B:
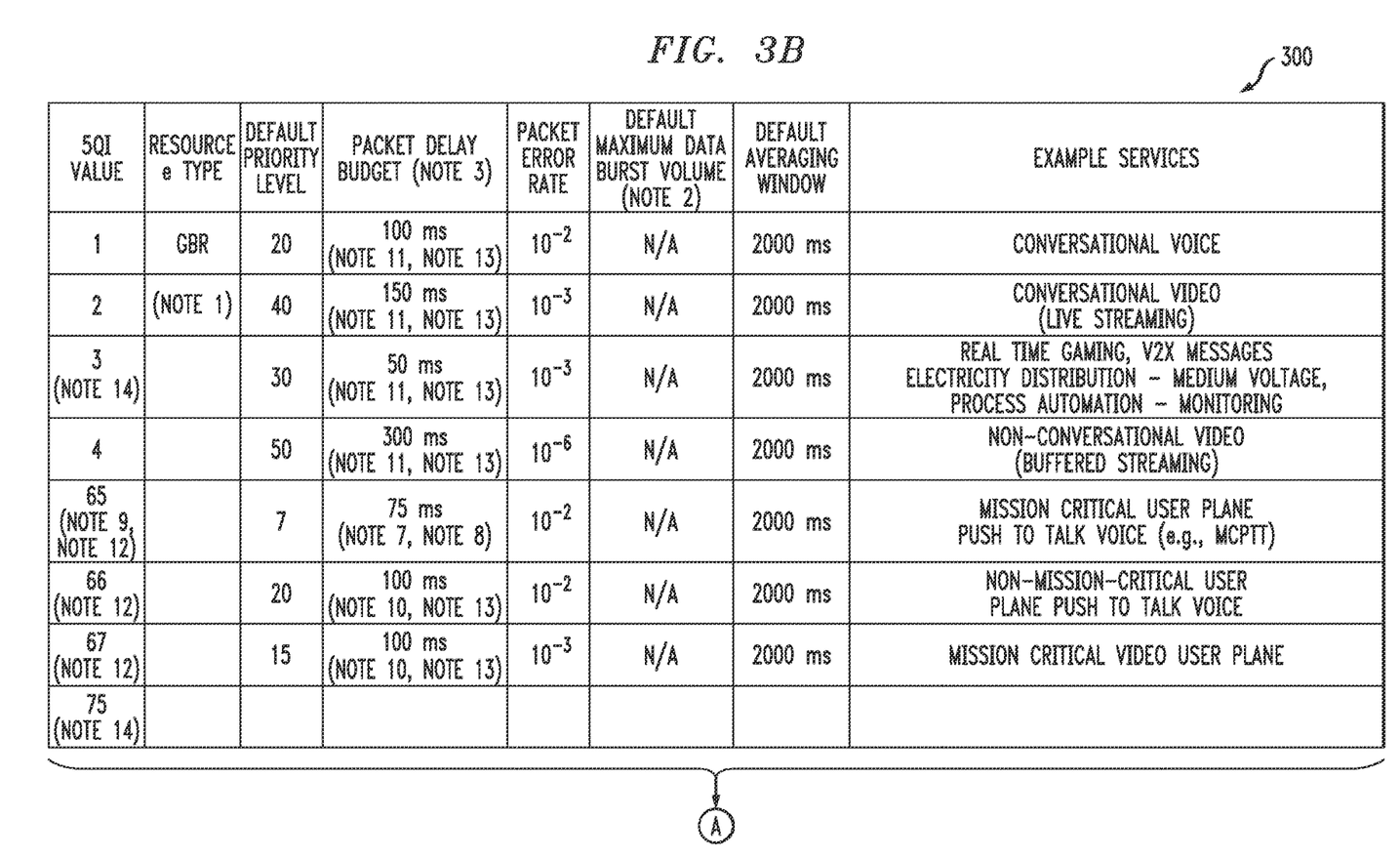
FIG. 3B illustrates a quality-of-service characteristics mapping table with which one or more illustrative embodiments may be implemented.

For example, assume a network sends a paging request (mobile-terminated (MT) message) to notify the UE of a pending MT service, e.g., such as an incoming voice call. The paging indication may additionally contain a "paging cause" value indicative of the type of service/data pending for the UE in the network. Thus, an MT message that includes at least one paging cause value may be illustratively referred to herein as a paging cause message. While TR 23.761 mentions one paging cause value, privacy and security aspects of exposing one or more paging cause values corresponding to different MT services and data, are addressed in illustrative embodiments described herein. The UE may be registered for any type of services in the network. As such, all quality-of-service (QoS) types should be considered. For example, the above-referenced TS 23.501 (in Table 5.7.4-1: Standardized 5QI to QoS characteristics mapping) indicates different services. The table is shown as table 310 in FIG. 3B. Illustrative embodiments provide for message security management for each of these different services, as well as a wide variety of others.

It is realized that when a paging cause value is transmitted by the communications network to the UE in an unprotected manner (i.e., in the clear), by initiating different services, an attacker can locate a target user/UE in a tracking area observing the paging broadcasts. This can lead to a security breach and thus a violation of privacy in certain situations. More particularly, if multiple unprotected paging cause values are transmitted to the UE, this provides more opportunity for fraudulent attackers in tracking the user and identifying them by invoking more service types to the UE.

That is, observing the unprotected paging cause value in a paging message and an immediate response from the UE, especially when there are not many other users currently operating, enables the malicious actor to track and isolate the particular user.

Reallocation of a globally unique temporary identifier (GUTI) helps to mitigate continuous tracking of the UE. However, it does not hide the UE, especially when the number of UEs are very few in a particular geographic area or a cell. Identification of the presence of the UE in a particular area is possible using distinctive paging cause values such as MC (Mission Critical) and V2X (Vehicle-to-everything), denoted in table 310 in FIG. 3B.

Further, when the type of service/data pending for the UE in the network is revealed by the paging cause value being unprotected, this provides enough critical input data for performing analytics on the network, e.g., frequency of paging for V2X/Smart grid service in the network.

Currently, paging messages are not protected, and thus the paging cause value is unprotected as well. If the paging cause value is exposed, the paging cause of a USIM (e.g., CM_IDLE or RRC_Inactive state) may be tampered with by an attacker, such that the USIM incorrectly responds to the fraudulent paging request. As a result, another USIM that has on-going services is disconnected from the network, causing denial-of-service (DoS) attacks.

Illustrative embodiments overcome the above and other drawbacks in communications networks by providing secure management of mobile-terminated messages, e.g., a paging message with one or more paging cause values.

Paging is a conventional procedure in wireless networks. When the UE is registered in multiple networks respectively using multiple USIMs, the UE can be in an "active" state in only one network at a time, and thus is in an "idle" state in the other network. When the UE is paged in the network where it is idle, e.g., the paging message is intended to alert the UE about incoming and pending traffic, it is very helpful for the UE to know the type of pending traffic in order to make a decision to attach to the other network. The type of pending traffic is indicated by the QoS type value in the network, i.e., the 5QI (5G QoS Identifier) value associated with the data packet, e.g., see table 310 in FIG. 3B. Accordingly, to assist the UE to make the determination to attach and receive the pending data/call, in addition to the paging indication, the paging cause value is also sent to the UE.

However, as mentioned above, when the paging cause value is transmitted in an unprotected state, privacy concerns are present. Thus, it is realized herein that if a paging cause value is sent along with a paging indication, at least the paging cause value should be sent in a concealed state. It is further realized herein that concealing a paging cause value should follow certain security properties, for example: (i) the concealed paging cause value should be unique to the UE, so that the UE is able to verify its authenticity; and (ii) the concealed paging cause value should be non-repeatable over multiple instances of paging for the same service type.

By way of one example, in one or more illustrative embodiments, the following steps can be performed:

(1) For a MUSIM-capable UE, initial registration and primary authentication is performed in respective PLMNs (same or different PLMNs) corresponding to the USIMs.

(2) The AMF is aware of the MUSIM-capable UE and the respective subscription information is received from the UDM.

(3) A paging token (more generally, a security value) is generated and stored in the AMF for later use. The generated paging token is shared to the UE instance in a non-access stratum (NAS) message (e.g., a security mode command). The UE stores the received paging token, as is, for future use.

(4) When the UE instance has to be paged, the AMF conceals a paging cause value (more generally, an indicator value) using the already-generated paging token and a downlink NAS count value (more generally, a communication link counter value). The concealed paging cause value (e.g., 8 bits) is forwarded to the RAN and the same concealed paging cause value is sent from the RAN (gNB) to the UE. The gNB (RAN) broadcasts the paging indication bit and the paging cause value.

(5) The UE listens to the paging indication and further receives the concealed paging cause value. The UE de-conceals the received/concealed paging cause value using the previously stored paging token and downlink NAS count value, and retrieves the paging cause value.

(6) The UE decides to take the call or decides to send a busy indication to the network based on the priority of the paging cause value (e.g., the 5QI value).

It is to be appreciated that the network (e.g., AMF) can re-assign a new paging token anytime later after the first security mode command, thus the UE can delete the old paging token and replace it with a newly issued paging token. The new paging token should only be received in a secured/integrity protected NAS message from AMF. Many advantages flow from this process, e.g.: the concealed paging cause value is unique to each UE instance; the concealed paging cause value is unique corresponding to a unique 5QI value, because the downlink NAS count varies; with only the concealed paging cause value, the attacker cannot determine the service and thus is prevented from causing malicious activities.

As will be further explained, some illustrative embodiments for secure message management will be described in terms of MUSIM devices while other embodiments will be described in terms of single USIM devices.

Figure 4:
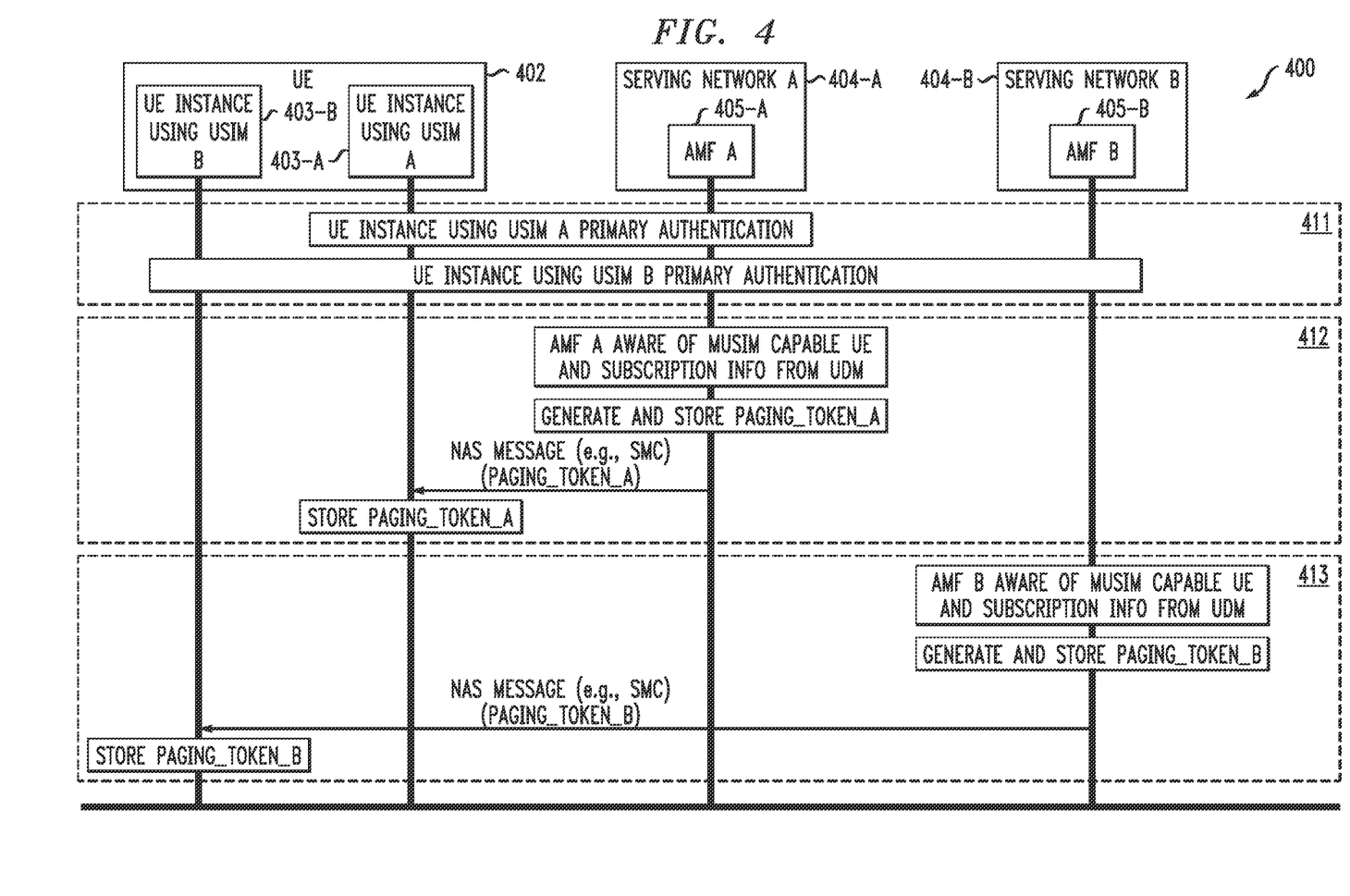
FIG. 4 illustrates a process for paging token generation, according to an illustrative embodiment.

FIG. 4 illustrates a process 400 for paging token generation associated with a MUSIM UE implementation, according to an illustrative embodiment. As mentioned, a MUSIM UE comprises two or more USIMs. In process 400, UE 402 comprises two USIMs, USIM A and USIM B. Each of the USIMs are represented as a distinct UE instance. Thus, as shown in process 400, UE 402 comprises UE instance 403-A (USIM A) and UE instance 403-B (USIM B). Also shown in process 400 are serving networks 404-A (serving network A) with AMF 405-A (AMF A) and serving network 404-B (serving network B) with AMF 405-B (AMF B). It is to be appreciated that the serving networks could belong to same PLMN or different PLMNs. It is to be understood that UE 402 can be active in only one of the two serving networks 404-A and 404-B at a time, and thus idle in the other serving network. For whichever of the two serving networks that UE 402 is idle, that serving network can page UE 402 to alert the user that there is pending data/call. Thus, each of the serving networks 404-A and 404-B generate paging tokens for UE 402.

More particularly, process 400 in FIG. 4 depicts the procedure of paging token generation at an AMF (for a 5GS) and storage of the paging token at the UE. It is to be appreciated that in alternative LTE embodiments the paging token can be generated at a mobility management entity (MME) and stored at the UE.

In step 411, for MUSIM-capable UE 402, initial registration and primary authentication is performed in respective PLMNs (same or different PLMNs) corresponding to the USIMs. UE instance 403-A using USIM A performs primary authentication with AMF 405-A and the respective home network. UE instance 403-B using USIM B performs primary authentication with AMF 405-B and the respective home network.

In step 412, it is assumed that AMF 405-A is aware of the MUSIM-capable UE 402 and subscription information from the UDM (not expressly shown). AMF 405-A generates and stores the PAGING_TOKEN_A. AMF 405-A sends the PAGING_TOKEN_A to UE instance 403-A using USIM A in an NAS message (e.g., a security mode command message). UE instance 403-A using USIM A stores the received PAGING_TOKEN_A.

In step 413, it is assumed that AMF 405-B is aware of the MUSIM-capable UE 402 and subscription information from the UDM (not expressly shown). AMF 405-B generates and stores the PAGING_TOKEN_B. AMF 405-B sends the PAGING_TOKEN_B to UE instance 403-B using USIM B in an NAS message (e.g., a security mode command message). UE instance 403-B using USIM B stores the received PAGING_TOKEN_B.

Figure 5:
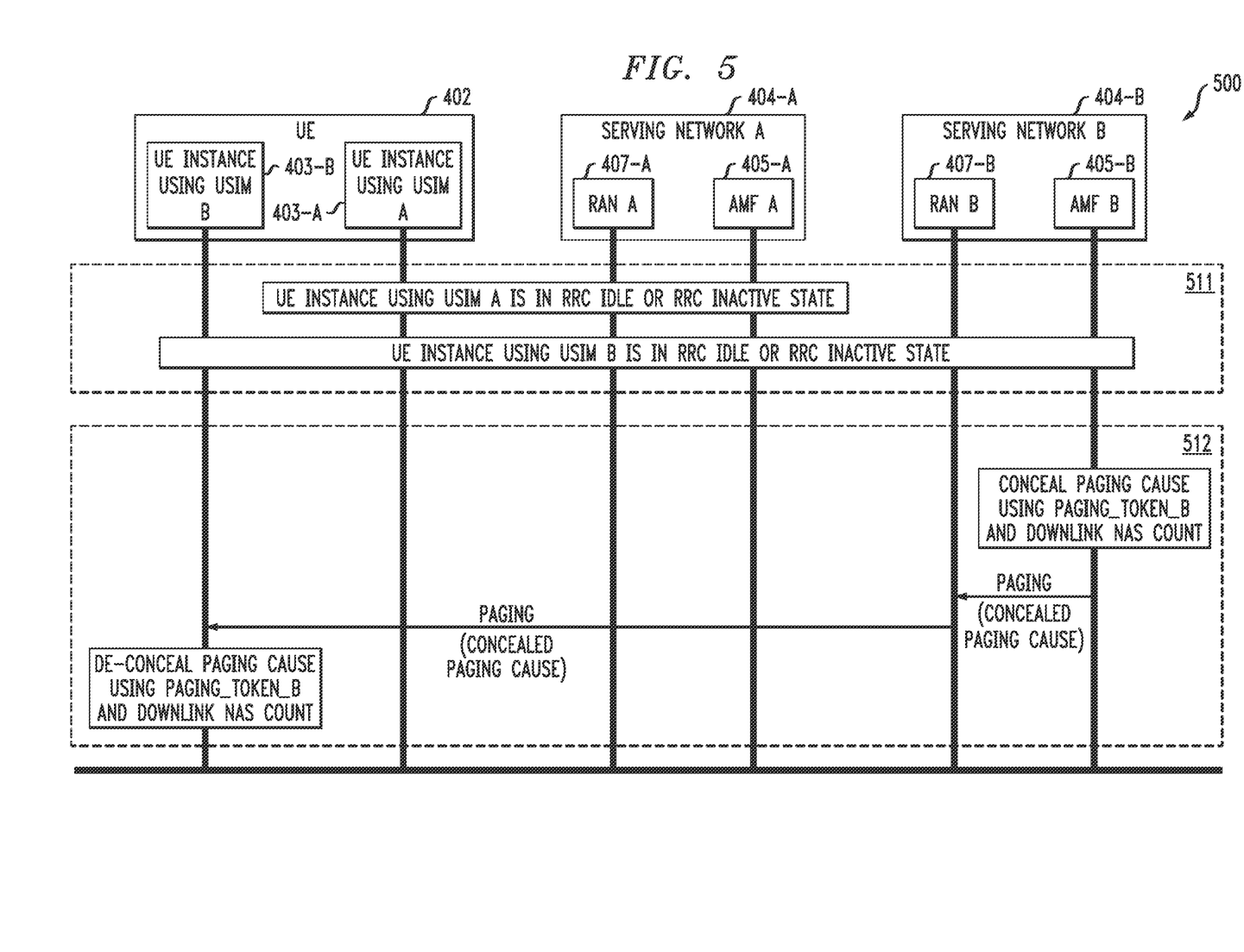
FIG. 5 illustrates a process for securely managing a paging cause value in a multiple universal subscriber identity module implementation, according to an illustrative embodiment.

FIG. 5 illustrates a process 500 for securely managing a paging cause value, according to an illustrative embodiment, in the context of MUSIM UE 402 and serving networks 404-A and 404-B from FIG. 4.

In step 511, assume that both UE instance 403-A using USIM A and UE instance 403-B using USIM B are either in RRC IDLE state or RRC INACTIVE state. Recall that while a UE may be in an idle state with more than one network, the UE can be in an active state with only one network. In this example, UE 402 is in an idle state with respect to both serving networks 404-A and 404-B.

In step 512, assume serving network 404-B needs to page UE instance 403-B using USIM B. AMF 405-B conceals paging cause value with PAGING_TOKEN_B and downlink NAS COUNT value, as will be further explained below in the context of FIG. 6A. The concealed paging cause value (e.g., 8 bits) is sent in an NG-AP message (PAGING) to RAN 407-B. Note that RAN 407-B (RAN B) comprises one or more gNB nodes (e.g., gNB 104 in FIG. 1). Similarly, serving network 404-A comprises RAN 407-A (RAN A) with one or more gNB nodes. Further in step 512, RAN 407-B forwards the concealed paging cause value in a paging message to UE instance 403-B using USIM B. UE instance 403-B using USIM B de-conceals the paging cause value using previously received PAGING_TOKEN_B and downlink NAS COUNT value, as will be further explained below in the context of FIG. 6B. Based on the paging cause value (e.g., 5QI value, see table 310 in FIG. 3B), UE 402 decides to take the call through serving network 404-B or decides to send a busy indication to serving network 404-B based on the priority of the paging cause value. More generally, the UE 402 generates (makes) a decision with respect to the idle state it is in (with respect to serving network 404-B) based on the obtained paging cause value. Thus, the UE 402 decides whether or not to enter into an active mode with serving network 404-B to access the pending service (e.g., voice call or some other pending service).

Note that AMF 405-B increases the downlink NAS COUNT by one. The least significant bit (LSB) of the 8-bit downlink NAS COUNT is considered. Note also that UE 402 receives the paging message with the concealed paging cause value. UE can de-conceal the paging cause value with the paging token and the downlink NAS COUNT value (or the uplink NAS COUNT value as will be further explained below).

Figure 6A:
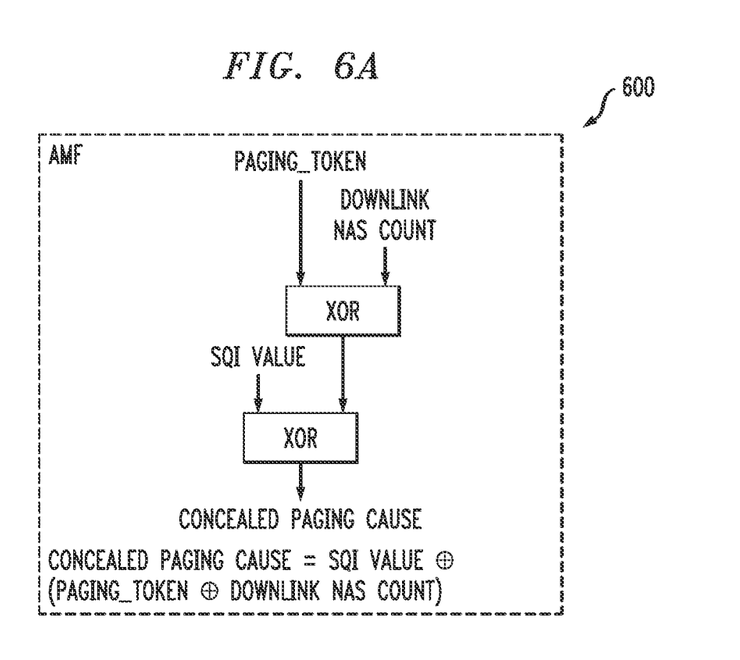
FIG. 6A illustrates a process for concealing a paging cause value, according to an illustrative embodiment.
Figure 6B:
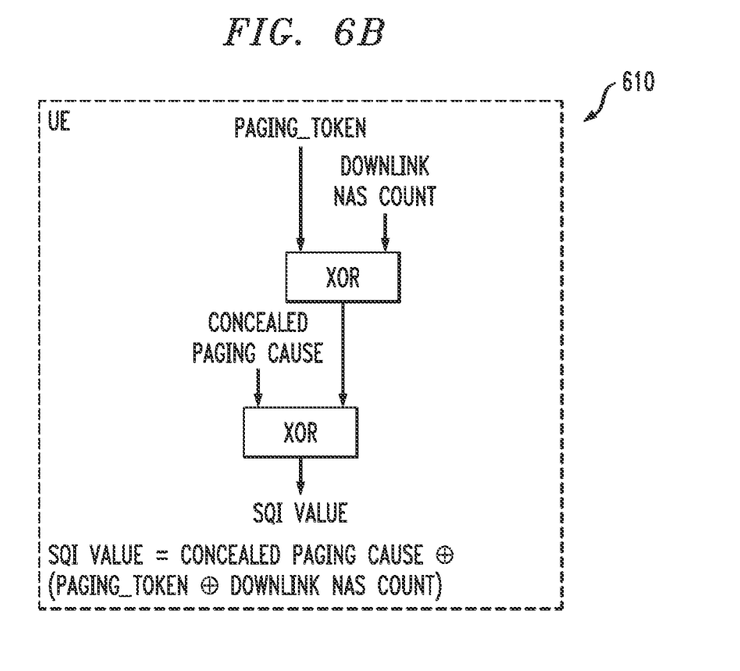
FIG. 6B illustrates a process for de-concealing a paging cause value, according to an illustrative embodiment.

FIG. 6A illustrates a process 600 for concealing a paging cause value, according to an illustrative embodiment, while FIG. 6B illustrates a process 610 for de-concealing a paging cause value, according to an illustrative embodiment.

As shown in FIG. 6A, at the AMF (405-A and 405-B), the generated paging token is exclusively-ORed (XORed) with the downlink NAS COUNT value, and the resulting value is XOR-ed with the paging cause value (5QI value), resulting in concealed paging cause value.

As shown in FIG. 6B, at the UE, the previously received/stored paging token is XORed with the downlink NAS COUNT value, and the resulting value is XORed with the concealed paging cause value to obtain the de-concealed paging cause value, e.g., the 5QI cause value.

It is to be appreciated that since the UE may not listen to every page, e.g., because of radio frequency (RF) conditions, the uplink NAS COUNT value may also be used in the concealment operation on the network side and de-concealment operation in the UE, in place of the downlink NAS COUNT value. The use of uplink NAS COUNT will not generate a different concealed value for the same paging cause value, until the UE becomes active and sends an uplink NAS message to the network. This can reduce any NAS count mis-synchronization errors if the downlink NAS COUNT value is incremented for every paging message.

While illustrative embodiments of FIGS. 4 and 5 are depicted in the context of a MUSIM UE device, concealment of the paging cause value can also be used in the case of UEs with a single USIM. In the case of a single USIM UE, the concealment functionality can be useful, for example, in situations where the UE is actively communicating on a side link channel over direct communication mode (PC5) to another UE or UEs, while it is in an idle mode and not connected to the network. In some illustrative situations, the UE can be a tablet and the user may be watching a downloaded movie. Thus, the UE decides whether to accept the incoming traffic or not based on the paging cause value.

Figure 7:
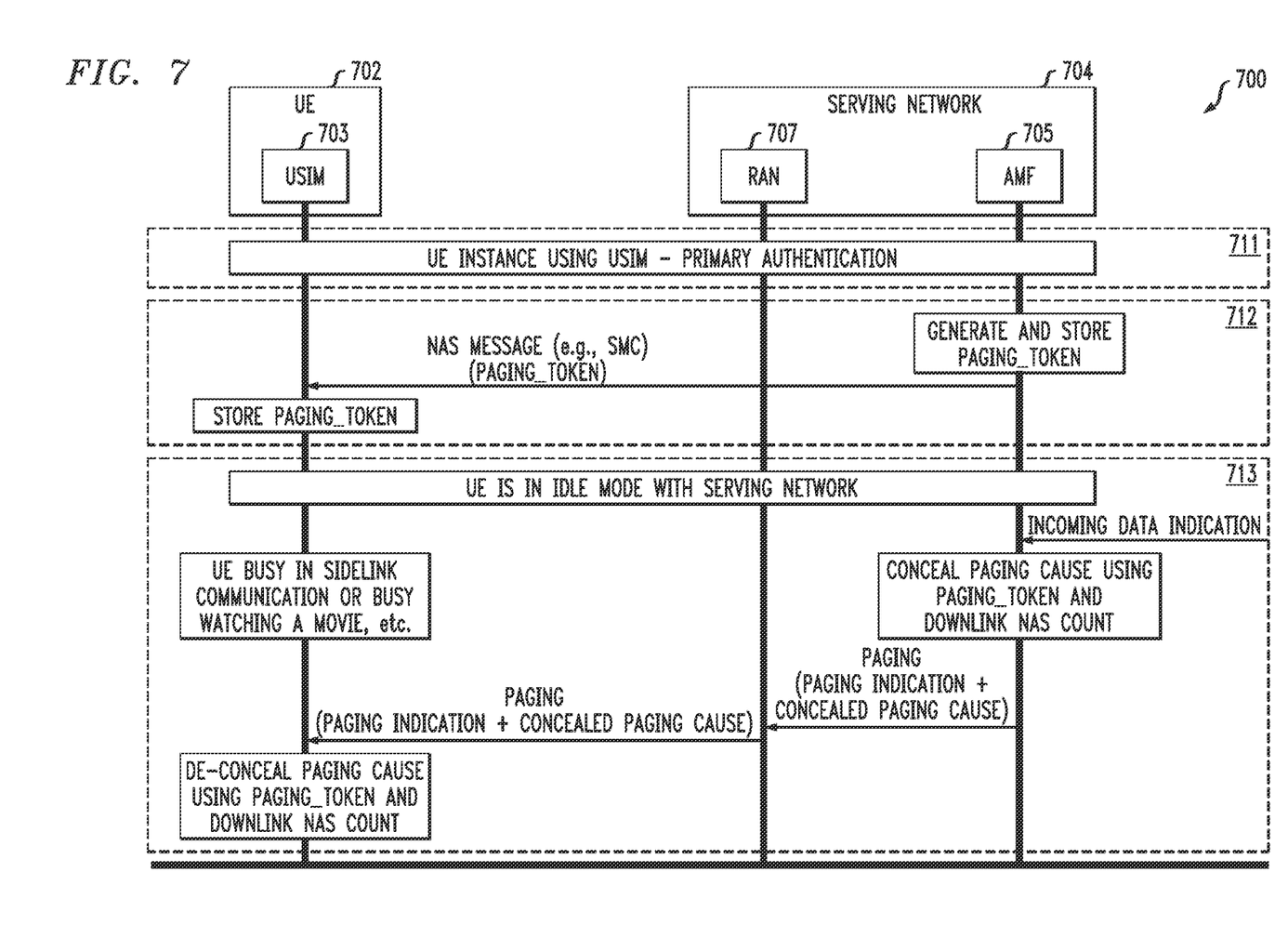
FIG. 7 illustrates a process for securely managing a paging cause value in a single universal subscriber identity module implementation, according to an illustrative embodiment.

FIG. 7 illustrates a process 700 for managing a paging cause value in a single universal subscriber identity module scenario, according to an illustrative embodiment. As shown, UE 702 comprises a single USIM 703, while the single serving network 704 comprises AMF 705 and RAN 707.

In step 711, UE 702 completes primary authentication with the serving network 704.

In step 712, AMF 705 assigns (generates, stores and sends) a paging token (PAGING_TOKEN) to UE 702. UE 702 stores the paging token. If there is no explicit assignment, in an alternative embodiment, UE 702 and AMF 705 may use the UE GUTI in place of a paging token.

In step 713, assume that UE 702 goes into an idle mode. That is, there is no UE context with any of the base stations (gNBs of RAN 707). UE 702 may be busy in a side link communication with one or more other UEs over a PC5 interface, or it may be busy by its own activities such as watching a downloaded movie where the UE is a tablet, etc. When there is incoming data for UE 702, AMF 705 gets alerted about the pending data and type of data (paging cause value or 5QI). AMF 705 decides to page UE 702. AMF 705 conceals the paging cause value (e.g., concealed as per FIG. 6A). The concealed paging cause value (e.g., 8 bits) is sent in an NG-AP message (PAGING) to RAN 707. RAN 707 broadcasts the paging indication and concealed paging cause value in a paging message. UE 702 listens to the paging message, decodes the paging message, and de-conceals the paging cause value using the previously stored PAGING_

TOKEN and the downlink NAS COUNT value as explained above. UE 702 decides to take the call or decides to send a busy indication to serving network 704 based on the priority of the paging cause value (5QI) value and its own communication or activity status.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
    at least one processor;
    at least one memory including computer program code;
    the at least one memory and the computer program code being configured to, with the at least one processor, cause the apparatus at least to:
    receive a concealed message from a communication network with which the apparatus is in an idle state;
    de-conceal the concealed message to obtain at least one indicator value using at least a security value previously agreed upon with the communication network; and
    generate a decision with respect to the idle state based on the obtained at least one indicator value.

2. The apparatus of claim 1, wherein de-concealing the concealed message further comprises using a communication link counter value along with the security value to de-conceal the concealed message.

3. The apparatus of claim 1, wherein the at least one indicator value comprises a paging cause value.

4. The apparatus of claim 3, wherein the paging cause value corresponds to a type of pending service available for the apparatus through the communication network.

5. The apparatus of claim 4, wherein generating a decision further comprises deciding whether or not to accept the pending service based on the paging cause value.

6. The apparatus of claim 4, wherein the type of pending service is indicated by a quality-of-service indicator describing the type of service available for the apparatus through the communication network.

7. The apparatus of claim 5, wherein the at least one memory and the computer program code being configured to, with the at least one processor, further cause the apparatus to enter into an active mode with the communication network to access the pending service.

8. The apparatus of claim 1, wherein the security value comprises a paging token.

9. The apparatus of claim 1, wherein the security value comprises a temporary identifier of the apparatus.

10. The apparatus of claim 1, wherein the apparatus is part of user equipment configured to access the communication network.

11. The apparatus of claim 10, wherein the user equipment is further configured to access at least another communication network.

12. The apparatus of claim 10, wherein the user equipment is further configured to access at least another communication device.

13. The apparatus of claim 11, wherein the user equipment comprises a first instance for accessing the communication network via a first universal subscriber identity module, and a second instance for accessing the other communication network via a second universal subscriber identity module.

14. The apparatus of claim 1, wherein the at least one indicator value indicates one or more types of pending service available for the apparatus through the communication network.

15. A method comprising:
    receiving, at user equipment, a concealed message from a communication network with which the user equipment is in an idle state;
    de-concealing the concealed message, at the user equipment, to obtain at least one indicator value using at least a security value previously agreed upon with the communication network; and
    generating a decision, at the user equipment, with respect to the idle state based on the obtained at least one indicator value.

16. The method of claim 15, wherein de-concealing the concealed message further comprises using a communication link counter value along with the security value to de-conceal the concealed message.

17. The method of claim 15, wherein the at least one indicator value comprises a paging cause value.

18. The method of claim 17, wherein the paging cause value corresponds to a type of pending service available for the user equipment through the communication network.

19. The method of claim 18, wherein generating a decision further comprises deciding whether or not to accept the pending service based on the paging cause value.

20. The method of claim 18, wherein the type of pending service is indicated by a quality-of-service indicator describing the type of service available for the apparatus through the communication network.

21. The method of claim 19, further comprising entering into an active mode with the communication network to access the pending service.

22. The method of claim 15, wherein the security value comprises a paging token or a temporary identifier of the user equipment.

23. An article of manufacture comprising a non-transitory computer-readable storage medium having embodied therein executable program code that when executed by a processor causes the processor to perform the steps of claim 15.

24. A method comprising:
    generating, at a network entity of a communication network, a message with at least one indicator value usable by user equipment to make a decision on an idle state with which the user equipment is in with respect to the communication network;
    concealing the message, at the network entity, using at least a security value previously agreed upon with the user equipment; and sending the concealed message from the network entity to the user equipment.

25. The method of claim 24, wherein the at least one indicator value corresponds to a type of pending service available for the user equipment through the communication network.

26. The method of claim 25, further comprising receiving a response from the user equipment to enter an active mode with the communication network to access the pending service.

\* \* \* \* \*